United States Patent [19]
del Rio et al.

[11] 3,920,611
[45] Nov. 18, 1975

[54] POLYACYL-DIHYDRAZINO-S-TRIAZINES AND THEIR PREPARATION

[75] Inventors: Marija del Rio, Obernburg am Main; Joachim Behnke, Miltenberg; Michael Wallrabenstein, Worth am Main; Dieter Frank, Elsenfeld, all of Germany

[73] Assignee: Akzona Incorporated, Asheville, N.C.

[22] Filed: May 20, 1974

[21] Appl. No.: 471,504

[30] Foreign Application Priority Data
May 24, 1973   Germany............................ 2326473

[52] U.S. Cl. ...... 260/47 CP; 260/29.2 N; 260/30.2; 260/30.6 R; 260/30.8 R; 260/30.8 DS; 260/31.2 N; 260/32.6 N; 260/47 CZ; 260/78 R; 260/78 TF; 260/247.5 C; 260/249.6; 260/249.8; 260/249.9
[51] Int. Cl.² .......................................... C08G 73/08
[58] Field of Search......... 260/47 R, 47 CZ, 47 CP, 60/78 R, 78 TF

[56]       References Cited
       UNITED STATES PATENTS
2,512,631  6/1950  Fisher et al. ............................ 260/2
3,130,182  4/1964  Frazer................................... 260/78
3,642,720  2/1972  Kray et al. ......................... 260/78.4
3,666,723  5/1972  Kray et al. ............................ 260/47
3,787,348  1/1974  Dobinson et al................... 260/32.6
3,803,075  4/1974  Kray et al. .......................... 260/30.2

Primary Examiner—Lester L. Lee
Attorney, Agent, or Firm—Johnston, Keil, Thompson & Shurtleff

[57]          ABSTRACT

Fiber-forming and film-forming linear polymers which are polyacyl-dihydrazino-s-triazines having recurring structural units of the formula

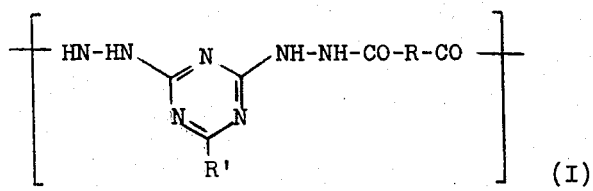

wherein R represents a divalent aromatic radical such as terephthaloyl while R' represents alkyl, alkoxy, phenyl, phenoxy, piperidyl, morpholyl or phosphonic acid dialkyl ester. The polymers are prepared by polycondensation of a 2,4-dihydrazino-s-triazine and an aromatic dicarboxylic acid dihalide at moderate temperatures while removing the exothermic heat of the reaction and in the presence of an acid acceptor. The high molecular weight polymer product can be wet-spun or dry-spun to form useful filaments, fibers, films, ribbons or the like.

12 Claims, No Drawings

POLYACYL-DIHYDRAZINO-S-TRIAZINES AND THEIR PREPARATION

It is an object of the present invention to provide a new class of linear fiber-forming and film-forming polymers based upon recurring units of the formula (I) above and a process for producing such polymers from readily available monomeric materials.

In accordance with the invention it has now been found that polyacyl-dihydrazino-s-triazines consisting essentially of the recurring units (I) are produced by reacting at least one 2,4-dihydrazino-s-triazine of the formula

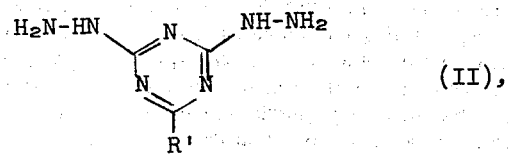

in which R' has the same meaning as in the formula (I), with at least one aromatic dicarboxylic acid dihalide in the presence of an acid acceptor while preferably mixing and cooling to withdraw the heat of reaction. In general, the reaction may be carried out at a temperature of about −10°C. to +60°C.

Suitable 2,4-dihydrazino-s-triazines (II) are those substituted in the 6-position by the radical R' which represents the following groups:

a. lower alkyl, i.e. an alkyl group of 1 to 4 carbon atoms such as methyl, ethyl, propyl, isopropyl or isobutyl;
b. phenyl;
c. lower alkoxy, i.e. an alkoxy group of 1 to 4 carbon atoms such as methoxy, ethoxy, propoxy, butoxy or isobutoxy;
d. phenoxy;
e. dialkylamino in which the alkyl groups are preferably lower alkyl of 1 to 4 carbon atoms and may be the same or different to provide a total of 2 to 8 carbon atoms, for example dimethylamino, diethylamino, dipropylamino, dibutylamino, diisopropylamino, diisobutylamino and N-methyl-N-ethyl-amino;
f. N-piperidyl;
g. N-morpholyl; and
h. phosphonic acid dialkyl esters of 2 to 8 carbon atoms, for example the dimethyl- or diethyl-phosphonic acid esters.

Among these monomeric compounds (II), the following are especially preferred:

2,4-dihydrazino-6-dimethylamino-s-triazine;
2,4-dihydrazino-6-methoxy-s-triazine;
2,4-dihydrazino-6-butoxy-s-triazine;
2,4-dihydrazino-6-phenyl-s-triazine;
2,4-dihydrazino-6-(phosphonic acid diethyl ester)-s-triazine;
2,4-dihydrazino-6-morpholino-s-triazine; and
2,4-dihydrazino-6-phenoxy-s-triazine.

The 2,4-dihydrazino-s-triazines are easily accessible by following known methods of preparation. For the production of the 6-dialkylamino derivatives, one can react cyanuric acid chloride with the desired dialkylamine and then treat the resulting 2,4-dichloro-6-dialkylamino-s-triazine with hydrazine; see German published application (DOS) No. 2,129,996 and U.S. Pat. No. 3,087,910. In a corresponding manner, the 6-alkoxy derivative can be produced from cyanuric acid chloride, the corresponding alkanol and hydrazine; See German published application (DOS) No. 2,129,996. The 6-alkyl derivatives are obtainable by reaction of hydrazine with the corresponding 2,4-dichloro-6-alkyl-s-triazines in accordance with Reimschuessel et al., J. Am. Chem. Soc., Vol. 82, p. 3756 (1960). The 2,4-dichloro-6-alkyl-s-triazines are easily accessible from cyanuric chloride and Grignard compounds; see Hirt et al., Helv. Chim. Acta., Vol. 33, p. 1368 (1950). For the production of the two preferred 2,4-dihydrazino-6-(phosphonic acid dialkyl ester)-s-triazines, it is preferable to proceed from cyanuric chloride through the intermediates of 2,4-diphenoxy-6-chloro-s-triazine, in accordance with Thurston et al, J. Am. Chem. Soc., Vol. 73, p. 2992 (1951), and 2,4-diphenxoy-6-(phosphonic acid dialkyl ester)-s-triazine; see German published application (DOS) No. 1,670,591.

As the other monomer for the polycondensation process of the invention, there are a number of aromatic dicarboxylic acid dihalides which may be employed, preferably those represented by the formula Hal—OC—R—CO—Hal in which R is a divalent aromatic radical of 6 to 15 carbon atoms and Hal is a bromine or chlorine atom. Suitable aromatic radicals are especially phenyl, diphenyl or

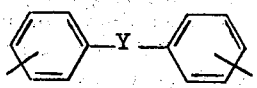

in which Y is one of the bridges —O—, —S—, —SO₂— or —CH₂—, the carboxylic acid halide groups preferably being in the meta- or para- positions with reference to the bridge Y. The following divalent radicals R are particularly useful:

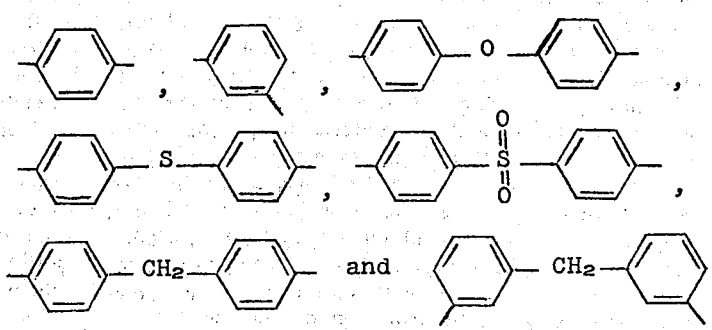

which may also be identified as being derived from the following dicarboxylic acids, respectively:

terephthalic acid; isophthalic acid;
diphenylether-dicarboxylic acid-4,4';
diphenylthioether-dicarboxylic acid-4,4';
diphenylsulfone-dicarboxylic acid-4,4';
diphenylmethane-dicarboxylic acid-4,4'; and
diphenylmethane-dicarboxylic acid-3,3'.

the polyacyl-dihydrazino-s-triazines of the invention can be extruded or spun into filaments and films with good commercial properties. Those polymers which can be processed into useful filamentary or filmaceous products of high strength are as follows:

Poly-terephthaloyl-2,4-dihydrazino-6-dimethylamino-s-triazine;
Poly-terephthaloyl-2,4-dihydrazino-6-methoxy-s-triazine;
Poly-terephthaloyl-2,4-dihydrazino-6-butoxy-s-triazine;
Poly-terephthaloyl-2,4-dihydrazino-6-phenyl-s-triazine;
Poly-terephthaloyl-2,4-dihydrazino-6-phosphonic acid diethyl ester-s-triazine;
Poly-isophthaloyl-2,4-dihydrazino-6-dimethylamino-s-triazine;
Poly-isophthaloyl-2,4-dihydrazino-6-methoxy-s-triazine;
Poly-isophthaloyl-2,4-dihydrazino-6-butoxy-s-triazine;
Poly-isophthaloyl-2,4-dihydrazino-6-phenyl-s-triazine;
Poly-isophthaloyl-2,4-dihydrazino-6-phosphonic acid diethyl ester-s-triazine;
Poly-diphenylether-4,4'-dicarboxylic aid-2,4-dihydrazino-6-dimethylamino-s-triazine;
Poly-diphenylether-4,4'-dicarboxylic acid-2,4-dihydrazino-6-methoxy-s-triazine;
Poly-diphenylether-4,4'-dicarboxylic acid-2,4-dihydrazino-6-butoxy-s-triazine;
Poly-diphenylether-4,4'-dicarboxylic acid-2,4-dihydrazino-6-phenyl-s-triazine; and
Poly-diphenylether-4,4'-dicarboxylic acid-2,4-dihydrazino-6-phosphonic acid diethyl ester-s-triazine.

The polyacyl-2,4-dihydrazino-s-triazine of the invention can be synthesized either by a solution polycondensation or by the so-called interfacial polycondensation process. The reaction between the 2,4-dihydrazino-s-triazines and the dicarboxylic acid dihalides as the initial monomers proceeds relatively rapidly in most cases. Where polycondensation takes place in a single phase system, stirring or continuous mixing is necessary primarily for the purpose of avoiding differences in concentration and to accelerate the reaction and the heat exchange. When working in a two phase system, the reaction naturally takes place at the interface and it is therefore especially desirable to provide good mixing or stirring and advantageously an emulsifier or the like to facilitate material interchange between both phases. Depending upon the size and volume of the mixing vessel and the efficiency of the selected mixing system, the mixer is ordinarily one which is operated at a speed of about 500 to 15,000 r.p.m. The added emulsifier is preferably used in an amount of about 0.1 to 1% by weight, with reference to the water, and can be easily selected from commercially available materials, for example such surface active agents as sodium lauryl sulfate, EMULPHOR EL (a polyoxyethylated vegetable oil) and INTRASOL WL (an oxyethylated product with OH — No. F3-F6).

Because the reaction is exothermic in character, it is important to cool the reaction mixture. The cooling also serves to withdraw the frictional heat arising from the mixing system. Any suitable cooling medium can be employed for removing heat from the reaction mixture, preferably using conventional indirect heat exchange apparatus where required in large scale operations. On a laboratory basis, a cooling bath around the reaction vessel is generally sufficient.

For economical reasons, a large excess of one of the monomeric reactants is usually avoided. A slight excess of one component or the other can be used without prejudice because this does not exert any special influence on the polycondensation in a two phase system. The amount of acid acceptor required for the polycondensation naturally depends upon the amount of hydrogen halide which is split off and is to be neutralized, which in turn is dependent upon the molar amounts of the initial monomers to be reacted. In general, there should be at least one equivalent of acid acceptor per mol of hydrogen halide set free in the polycondensation.

According to the solution polycondensation process, the reaction components are dissolved together in a suitable inert organic solvent and reacted in a homogeneous phase. Suitable solvents for this single phase polycondensation are especially the aprotic solvents such as dimethyl acetamide, N-methylpyrrolidone, hexamethylphosphoric acid triamide, sulfolane (tetrahydrothiophene-1,1-dioxide) or tetramethylurea. A mixture of such solvents can also be used. Those solvents which are especially preferred are hexamethylphosphoric acid triamide, dimethyl acetamide and N-methyl-pyrrolidone. These solvents should be as dry as possible, e.g. with a water content of less than 0.01% by weight. Anhydrous solvents are thus especially preferred.

Acid acceptors which are soluble in such organic solvents are for example the tertiary organic nitrogen bases such as pyridine and its methyl derivative (picoline) or triethylamine and similar tertiary amines. While it may be preferred to use those acid acceptors which are soluble in the particular solvent system chosen for the reaction medium, one may also use insoluble acid acceptors for binding the halogen halide split off in the reaction, e.g. such as soda (sodium carbonate), lithium carbonate, alkali bicarbonates and acetates. In this case, these insoluble acid acceptors or binding agents are suspended in very finely divided form in the organic phase. Aprotic solvents, such as hexamethylphosphoric acid triamide, dimethyl acetamide, N-methylpyrrolidone and tetramethylurea, which possess a tertiary nitrogen atom, may also be simultaneously employed to bind the hydrogen halide being set free, e.g. hydrogen chloride.

It has been found to be especially advantageous to carry out the polycondensation in at least one of said aprotic solvents in the presence of about 5 to 12% by weight of lithium chloride, taken with reference to the solvent. Where the solvent contains lithium chloride, the 2,4-dihydrazino-s-triazine is more soluble as a rule than in the pure solvent. Aside from this property as a solubilizing agent, the lithium chloride also has the effect of generally increasing the degree of polycondensation, i.e. so as to more readily achieve higher molecular weight polymers with better fiber-forming propertics. An especially useful reaction medium for purposes of the invention has been found to be a 5–12% by weight solution of lithium chloride in dimethyl acetamide and/or N-methyl-pyrrolidone.

The degree of polycondensation of the polyacyl-2,4-dihydrazino-s-triazines of the invention, when carrying out a solution polycondensation, depends not only upon the reaction medium itself but also upon the concentration of the monomeric reactants, the reaction temperature and the period of time for the reaction. However, because the viscosity of the reaction medium increases with an increase in the monomer concentration, there is a limit to the extent by which the degree of polycondensation can be extended through a greater concentration of monomers due to the fact that there is a corresponding limit on the capacity of available equipment for stirring or mixing the reaction medium. Thus, for practical reasons, one must avoid a reaction medium which is too viscous. By way of example, the limit on the ability of stir or mix the reaction medium is reached in the production of poly-isophthaloyl-2,4-dihydrazino-6-dimethylamino-s-triazine when one employs the following maximum concentrations of the monomeric reactants:

| Solvent | Max. Conc. of Monomers |
| --- | --- |
| Hexamethylphosphoric acid triamide | 0.5 mol/liter |
| Dimethyl acetamide | 0.75 mol/liter |
| N-methylpyrrolidone | 1.0 mol/liter |

The reaction temperature for the solution polycondensation process should be about −10°C. to +60°C., preferably about 5°C. to 40°C. As a rule, the degree of polycondensation increases with increasing reaction temperatures, but it is undesirable to exceed the cited temperatures because the polymer tends to form a gel or semi-solid mass.

As will be readily understood, the degree of polycondensation is dependent upon the length of the reaction. In general, a reaction time of about 2 to 16 hours is needed to obtain polymers having satisfactory fiber- and film-forming properties.

A further especially preferred embodiment of the invention resides in carrying out the polycondensation in two inert solvents which are not miscible with each other. It is apparent in this case that the reaction takes place largely at the interface between the two solvents. In this special procedure, one phase consists of an inert solvent for the acyl dihalide, i.e. the dicarboxylic acid dihalide monomer, while the other phase consists of the solvent for the 2,4-dihydrazino-s-triazine monomer. The acid acceptor is preferably dissolved in the same solvent used for the 2,4-dihydrazino-s-triazine.

As suitable solvents for the acyl dihalide, the following are given by way of example: methyl acetate, ethyl acetate, tetrahydrofuran, tetrahydropyran, dioxane, hexane, heptane, cyclohexane, decalin, chloroform, carbon tetrachloride, benzene, toluene, methylene chloride, monochlorobenzene and acetonitrile. The most useful solvents may be classified as hydrocarbons and chlorinated hydrocarbons, and suitable solvents of this one phase can be readily selected for the acyl dihalide monomer based upon its capacity to dissolve this monomer while being immiscible with the inert solvent of the other phase.

Solvents used for the second phase, i.e. for the 2,4-dihydrazino-s-triazine and the acid acceptor, are preferably selected from the class consisting of water, N-dimethylacetamide, hexamethylphosphoric acid triamide, N-methylpyrrolidone and tetramethylurea. The solvents given in each case are naturally combined so as to fulfill the condition that they form two immiscible phases as liquid solvents at the reaction temperature. Especially preferred mixtures are those obtained by using water for one phase and toluene, benzene, hexane, carbon tetrachloride, methylene chloride or mixtures of these organic solvents for the other phase.

It has also been found that the addition of an emulsifier together with an intensive mixing is advantageous for this twophase interfacial polycondensation. High-speed mixers, for example a Kotthoff mixer, Waring Blender, Star-Mix or similar types of mixers are especially suitable for this purpose.

One preferred embodiment of this two-phase process provides that one of the two phases consists of an aqueous solution of the 2,4-dihydrazino-s-triazine and the acid acceptor while the other phase consists of benzene, toluene, hexane, carbon tetrachloride, methylene chloride or mixtures thereof. As the acid acceptor in this case, the alkali metal carbonates and bicarbonates, particularly sodium or potassium carbonate and bicarbonate, have been found to be especially useful. Strong bases are also recommended as the acid acceptor under circumstances where there is a sharp distinction between the two liquid phases of the reaction mixture. Thus, strong bases become very useful provided that the components forming the organic phase and the aqueous phase remain substantially completely insoluble in each other, i.e. when the miscibility of the two phases is as small as possible. It is then possible to avoid any extensive saponification of the of the dicarboxylic halide reactant. The suitability of various common acid acceptors and the choice between strong or weak bases can be readily determined by a simple preliminary test.

Another suitable polycondensation technique for the production of the polymers of the invention resides in the use of water as one phase and a water-miscible, inert organic solvent as the second phase with the proviso that the water-miscibility of the inert organic solvent is completely or practically completely prevented by the addition of a so-called salting-out agent. The principle of separating a normally miscible organic solvent from water by adding a salting-out agent is well known and does not require elaboration because it merely represents another means of forming the two-phase reaction mixture. Thus, one of the two phases in this case consists of an aqueous triazine solution which contains the salting out agent, and the other phase consists of a solution of the dicarboxylic halide in an inert organic solvent. Again, strong mixing is recommended in this two-phase technique.

The term "inert" is used herein to mean that a particular component of the reaction mixture does not enter into the polycondensation reaction but serves only to maintain a definite or sharply defined liquid reaction phase. Thus, in addition to the inert solvents themselves, any salting-out agent should also be substantially inert with respect to the monomers and the reaction products under the reaction conditions. Otherwise, the salting-out agent may be any water-soluble salt commonly used for this purpose.

Depending upon the kind of organic solvent used for this phase of the reaction medium, the acid acceptor may also simultaneously serve the function of the salting-out agent. Soda, i.e. sodium carbonate, is especially useful as both acid acceptor and salting-out agent. In general, the choice of the salting-out agent and its required amount depends upon the particular solvent and its miscibility in water, something which can be easily determined by a routine test if not already known as in most cases.

This alternative use of a normally water-miscible inert organic solvent together with a salting-out agent offers a wider range in the choice of suitable solvents for the two phases in the production of polyacyl-2,4-dihydrazino-s-triazines. In this manner, a much greater number of solvents can be selected to provide a separate phase for the dicarboxylic halide reactant. Examples of such water-miscible solvents are especially 1,2-dimethylglycol carbonate, tetrahydrofuran and acetonitrile. Again, mixtures of such organic solvents may also be used.

In view of the foregoing explanations of providing a two-phase reaction system, it will be apparent that one can refer to a two-phase liquid reaction medium consisting essentially of two distinct solvents which are substantially immiscible with each other under the reaction conditions which may include the addition of a salting-out agent.

When carrying out an interfacial condensation reaction according to the invention, it is preferable to work at approximately room temperature, for example, within a range of about 10°–30°C., preferably 15°–25°C. As a rule, the reaction period should be at least about 15 to 30 minutes to provide a satisfactory fiber-forming and film-forming polymer.

The effect of the lithium chloride on increasing the degree of polycondensation as described in the solution condensation procedure also occurs when the process of the invention is carried out according to the interfacial or two-phase method. For this reason, the use of lithium chloride is preferred in both cases.

Polyacyl-2,4-dihydrazino-s-triazines of different molecular weights are produced within the scope of the invention according to the particular method of polycondensation. The molecular weight is also influenced by the monomeric reactants but can be varied over a relatively wide range even when starting with the same monomers. In general, the polycondensate product has a reduced viscosity ($\eta_{red}$) of about 0.9 to 11, measured at 20°C. as a solution of 1 gram of the polymer in 100 ml. of 98% formic acid.

The polymers of the invention are colorless to yellow and are soluble in dimethyl sulfoxide, dimethyl formamide, N-methyl-pyrrolidone, hexamethyl-phosphoric acid triamide, sulfuric acid, formic acid and sodium or potassium hydroxide agueous solutions. Some of the polymers are decomposed or degraded in concentrated caustic potash solution, i.e. conc. KOH in water.

The essentially linear polymers of the invention can be formed into useful filaments, fibers, foils and the like with valuable special properties. The forming, shaping, extrusion or so-called spinning of the polymer can be carried out according to the wet process or the dry process. For example, wet spinning can take place by dissolving the polymer in aqueous caustic potash (KOH) or caustic soda (NaOH) and then solidifying the extruded filaments or films in an acetic acid bath. Especially suitable polymer solvents for carrying out the dry spinning process are dimethylacetamide, N-methylpyrrolidone and dimethyl formamide.

The following examples illustrate the invention with the understanding that the invention is not limited by such examples. Unless otherwise stated, the measurement of the reduced viscosity ($\eta_{red}$) of the polymer product is with reference to a 1% solution of the polymer in 98% formic acid at 20°C.

EXAMPLE 1

In a 500 ml. flask equipped with a mixer and a thermometer while introducing nitrogen as an inert atmosphere, there were dissolved 12.5 g. LiCl and 92.5 millimols (17.02 g.) of 2,4-dihydrazino-6-dimethylamino-s-triazone in 226 ml. of absolute, amine-free dimethylacetamide. The resulting solution was then cooled down to +5°C., and under strong mixing and flushing with nitrogen, 92.5 millimols (27.28 g.) of diphenylether-4,4'-dicarboxylic acid dichloride were added to the solution over a period of about 5 minutes such that the temperature was maintained at about 30°C. The reaction mixture became highly viscous after a relatively short period of time. Mixing was continued for about 16 hours, and the mixture was then poured into an aqueous NaHCO$_3$-solution wherein the polymer precipitated out and the HCl produced by the condensation became neutralized.

The product was washed with water and methanol and dried at 60°C. under vacuum. The viscosity ($\eta_{red}$) was 4.9.

EXAMPLE 2

The polycondensation was carried out in solution as described in Example 1. In this case, however, the solvent used was an absolute, amine-free N-methylpyrrolidone-(2). The reaction period was 2 hours. The resulting polycondensate had a reduced viscosity $\eta_{red} = 6.1$.

EXAMPLE 3

20 millimols (3.68 g.) of 2,4-dihydrazino-6-dimethyl-amino-s-triazine, 75 g. LiCl and 3.6 g. of NaHCO$_3$ as an acid acceptor were dissolved in 750 ml. of H$_2$O and the resulting solution placed in a vessel equippped with a Kotthoff mixer. While stirring and with outer cooling of the vessel, 20 millimols (5.9g.) of diphenylether-4,4'-dicarboxylic acid dichloride were dissolved in 750 ml. of absolute benzene and added in a jet stream, the mixture being stirred at 2800 r.p.m. for 30 minutes while maintaining the temperature at about 25°C. The highly expanded or swollen white polymer resulting from this condensation was then suctioned off, washed with water and methanol and finally dried at 60°C. under vacuum. The viscosity ($\eta_{rel}$) amounted to 1.8.

EXAMPLE 4

50 millimols (9.2 g.) of 2,4-dihydrazino-6-dimethylamino-s-triazine were dissolved in a nitrogen atmosphere in 100 ml. absolute, amine-free dimethylacetamide and cooled with mixing to +5°C. Then, in a period of about 5 minutes, 50 millimols (14.75 g.) of diphenylether-4,4'-dicarboxylic acid dichloride were continuously added whereby the temperature rose to 30°–35°C. After mixing for 16 hours, the viscous reaction mixture was poured into an aqueous sodium bicarbonate solution. The polymer then precipitated and the HCl arising in the reaction was neutralized after which the polymer was separated by suction filtration, washed with water and methanol and then dried at 60°C. under vacuum to yield a colorless product. The reduced viscosity of this product amounted to 2.24.

EXAMPLE 5

20 millimols (3.42 g.) of 2,4-dihydrazino-6-methoxy-s-triazine was dissolved in a solution of 112.5 g. of LiCl in 650 ml. of water and placed in a reaction vessel cooled from the outside. 3.4 g. of NaHCO₃ in 100 ml. of water was then added and the resulting mixture stirred under cooling with a Kotthoff mixer. Next there were added to the mixture, in the form of a jet stream, 20 millimols (5.9 g.) of diphenylether-4,4'-dicarboxylic acid dichloride dissolved in 100 ml. absolute benzene + 650 ml. absolute hexane. The resulting reaction mixture was then mixed for 30 minutes during which the temperature rose to 25°–27°C. The resulting polycondensate was filtered off by suction, washed with water and methanol and dried at 70°C. under vacuum. The reduced viscosity of the product was 2.7.

EXAMPLE 6

In a three-necked flask provided with a mixer, a drop funnel and a thermometer, 5% by weight of dry lithium chloride (taken with reference to the total amount of the solvent) was dissolved with mixing in 90 ml. of a water-free and amine-free dimethylacetamide. After cooling to about room temperature, there was introduced 40 millimols of 2,4-dihydrazino-6-dimethylamine-2-triazine. As soon as the monomer was dissolved, a solution of 40 millimols of isophthalic acid dichloride in 10 ml. of water-free toluene was slowly added dropwise with mixing and water cooling at 18°–25°C.

After this dropwise addition of the dichloride, the water cooling was removed and the reaction mixture stirred at room temperature for 6 hours. Thereafter the viscous solution was neutralized with an equivalent amount of sodium bicarbonate, and the polycondensate immediately precipitated.

After washing four times with water (by suspension and filtration), the polymer was finally washed with methanol, filtered and dried in a vacuum drying chamber at 70°C. The resulting polyisophthaloyl-6-dimethanol-2,4-dihydrazino-s-triazone had a reduced viscosity ($\eta_{red}$) of 10.85. The yield of the polymer amounted to 96%.

EXAMPLES 7–15

In the same manner as described in Example 6, the compounds 2,4-dihydrazino-6-methoxy-s-triazine were reacted with different dicarboxylic acid dichlorides according to the solution polycondensation method. The monomeric reactants, monomer concentrations, solvents, reaction times and product viscosities are set forth in Table I as follows:

TABLE I

| Example No. | 2,4-Dihydrazino-6-R'-triazine where R' is: | Dicarboxylic acid chloride ClOC-R-COCl where R is: | Mol/l. | Solvent | Reaction time-hrs. | $\eta_{red}$ |
|---|---|---|---|---|---|---|
| 7 | CH₃\N— /CH₃ | Isophthal- | 0.4 | NMP + 5% LiCl | 16 | 6.46 |
| 8 | " | Isophthal- | 0.5 | HMP | 6 | 3.62 |
| 9 | " | Isophthal- | 0.7 | DMA | 6 | 4.50 |
| 10 | " | Terephthal- | 0.4 | DMA | 6 | 2.95 |
| 11 | " | Terephthal- | 0.4 | HMP | 6 | 2.75 |
| 12 | " | Diphenylmethane-3,3'- | 0.3 | DMA | 16 | 1.85 |
| 13 | " | Diphenylsulfone-4,4'- | 0.65 | DMA | 16 | 1.50 |
| 14 | CH₃—O— | Isophthal- | 0.18 | NMP | 16 | 1.42 |
| 15 | " | Terephthal- | 0.25 | DMA + 5% LiCl | 16 | 2.25 |

NMP = N-Methylpyrrolidone
HMP = Hexamethylphosphoric acid triamide
DMA = Dimethylacetamide

EXAMPLE 16

At room temperature there were dissolved in 750 ml. of water one after the other 30 millimols of 2,4-dihydrazino-6-dimethylamino-s-triazine and 60 millimols of sodium bicarbonate. The solution was placed into a reaction kettle. Under strong mixing (2.8·10³ r.p.m.) and cooling with water, a solution of 30 millimols of terephthaloyl chloride in 750 ml. of water-free toluene was then added to the kettle. After 25 minutes, the polycondensate was filtered off, washed four times with water and then with methanol. The product was finally dried at 70°C. under a vacuum. The yield was 96%, and the product exhibited a reduced viscosity of 2.95.

EXAMPLES 17–20

In the same manner as described in Example 16, 2,4-dihydrazino-6-dimethylamino-s-triazine was reacted with isoor terephthalic acid dichloride in various solvent mixtures in accordance with the interfacial condensation method. The monomeric reactants, monomer concentration, solvent mixtures, reaction time and viscosity of the polymer product are set forth in Table II as follows:

TABLE II

| Example No. | 2,4-Dihydrazino-6-R'-triazine where R' is: | Dicarboxylic acid chloride ClOC-R-COCl where R is: | Solvent | Mol/l | $\eta_{red}$ |
|---|---|---|---|---|---|
| 17 | CH₃\N— /CH₃ | Isophthal- | Toluene/Wasser | 0.040 | 2.72 |
| 18 | " | Terephthal- | CTC/Wasser | 0.040 | 1.7 |
| 19 | " | Terephthal- | Toluene/Wasser | 0.013 | 2.30 |
| 20 | " | Isophthal- | Hexane/DMA + 5% LiCl | 0.25 | 2.50 |

CTC = carbon tetrachloride

EXAMPLE 21

In a 250 ml. three-necked flask provided with a mixer, inner thermometer and drop funnel, 5.4 g. of water-free lithium chloride and 50 millimols (11.21 g.) of 2,4-dihydrazino-6-morpholine-s-triazine were dissolved in 100 ml. absolute N-methyl-pyrrolidone while excluding atmospheric moisture by leading nitrogen over the contents of the flask. The solution was cooled to 15°C. and reacted with 50 millimols (10.15 g.) of isophthaloyl chloride dissolved in 15 ml. absolute benzene and added dropwise at 15°–20°C. The reaction mixture was then stirred for another 15 hours at room temperature after which it was poured into 500 ml. of water with intensive mixing and then neutralized with sodium bicarbonate. The resulting polymer which deposited in fiber-like form was thoroughly washed with water and methanol and then dried under vacuum at 70°C.

The resulting colorless polymer exhibited a reduced viscosity ($\eta_{red}$) of 6.38.

EXAMPLE 22

In a 250 ml. three-necked flask equipped with a mixer and thermometer as in the preceding example, 10.4 g. of water-free lithium chloride and 50 millimols (11.66 g.) of 2,4-dihydrazino-6-phenoxy-s-triazine were dissolved in 100 ml. absolute dimethylacetamide while leading in nitrogen to exclude atmospheric moisture. The solution was cooled to 10°C. and combined in portions with 50 millimols (14.75 g.) of solid diphenylether-4,4'-dicarboxylic acid dichloride such that the reaction temperature did not rise above 20°C. After a further 15 hours mixing at room temperature, the viscous polymer solution was poured into water with intensive stirring and then neutralized with sodium carbonate. The deposited colorless polymer was washed several times with water and methanol and dried under vacuum at 70°C. The reduced viscosity ($\eta_{red}$) of the polymer was 2.53.

EXAMPLE 23

40 millimols (8.69 g.) of 2,4-dihydrazino-6-phenyl-s-triazine were dissolved in a 250 ml. 3-necked flask under a nitrogen stream in 100 ml. of absolute N-methylpyrrolidone. To this solution at 15°C. under mixing, there was suddenly added 40 millimols (8.12 g.) of solid terephthaloyl chloride. The solution was heated up to 25°C. by this addition. The solution was then mixed for an additional 15 hours at room temperature, after which the resulting yellow solution of the polymer was poured into 400 ml. of water and neutralized with sodium bicarbonate. The precipitated light yellow polymer was thoroughly washed with water and methanol and then dried under vacuum at 70°C.

The reduced viscosity of the polymer product was 2.95.

EXAMPLE 24

15 millimols (3.49 g.) of 2,4-dihydrazino-6-phenoxy-s-triazine were dissolved at 60°C. in 900 ml. of a 15% aqueous lithium chloride solution, then cooled to 20°C. and placed together with an aqueous solution of 30 millimols (2.52 g.) of sodium bicarbonate into the reaction kettle. The solution was strongly mixed with a so-called "mixing siren" ($2.8 \cdot 10^3$ r.p.m.) and combined into a batch with a solution of 15 millimols (3.04 g.) of isophthaloyl chloride in 900 ml. of absolute hexane. Under water cooling, this mixture was further mixed for another 30 minutes, then filtered with suction and washed several times with water and methanol. The colorless polymer was finally dried under vacuum at 70°C.

The reduced viscosity of the polymer product was 1.93.

EXAMPLE 25

A. Production of 2,4-dihydrazino-6-phosphonic acid diethyl ester-s-triazine 0.1 mol (29.9 g.) of diphenoxy-chloro-s-triazine and 0.11 mol (18.4 g.) of triethylphosphite were placed in a 250 ml. three-necked flask provided with a mixer, cooler, thermometer and a nitrogen supply line. Under a stream of $N_2$, the reaction mixture was heated slowly to 140°C. and stirred at this temperature for 2 hours. It was then cooled to 120°C. and the excess triethylphosphite distilled off under vacuum. As the residue, there was obtained a yield of 80% of 2,4-diphenoxy-6-phosphonic acid diethyl ester-s-triazine with a melting point of 77°–79°C.

2 mols (101 g.) of 99% hydrazine hydrate and 500 ml. absolute tetrahydrofuran were introduced into a 2-liter, three-necked flask equipped with a mixer, thermometer and drop funnel. A solution of 1 mol (401.3 g.) of 2,4-diphenoxy-6-phosphonic acid diethyl ester in 2500 ml. of tetrahydrofuran were then added dropwise to the flask. The reaction mixture was then boiled at reflux for 3 hours and suction filtered, the residue being washed with acetic acid ethyl ester and dried in a vacuum at 40°C. The 2,4-dihydrazino-6-phosphonic acid diethyl ester was obtained in a yield of 80%.

B. Production of poly-isophthaloyl-(2,4-dihydrazino-6-phosphonic acid diethyl ester)-s-triazine In a 250 ml. three-necked flask having a stirrer, thermometer and drop funnel, 50 millimols (13.86 g.) of 2,4-dihydrazino-6-phosphonic acid diethyl ester-s-triazine were dissolved in 50 ml. absolute N-methylpyrrolidone while excluding atmospheric moisture by conducting nitrogen over the contents of the flask. The solution was cooled to 20°C. and at this temperature mixed dropwise with 60 millimols (10.15 g.) of isophthaloyl chloride dissolved in 15 ml. of absolute benzene. The resulting mixture was stirred for a further 15 hours at room temperature, then slowly poured into 1000 ml. of water with intensive stirring and the filtered off product finally washed thoroughly with water. The resulting colorless polymer was dried under vacuum at 70°C. It had a reduced viscosity of 1.98.

The above-noted polymers may be wet spun and/or dry spun into filaments which are readily stretched in a conventional manner to develop valuable fibrous properties. Moreover, one may also extrude and stretch films of these new polymers to obtain relatively strong and stable sheets, ribbons or similar products. It is especially useful to obtain such fibers or films from polymers which have a reduced viscosity (measured as in all of the examples) of at least about 2 preferably about 2 to 11.

These new polymers are also highly useful in forming complex metal-containing compounds as explained in detail in our copending United States application, filed concurrently herewith as our case number A3GW31686 and based on prior German Application No. 23 26 472, filed May 24, 1973. This copending application is incorporated herein by reference as fully as if set forth in its entirety. The complex metal compounds provide a wide range of colored pigments, and these compounds have a sufficiently high content of metal to act as metallic catalysts. Some of the new polymers when complexed with metals may also be formed into flame-resistant fibers, yarns or similar textile products.

The invention is hereby claimed as follows:

1. A fiber-forming linear polyacyl-dihydrazino-s-triazine consisting essentially of recurring structural units of the formula

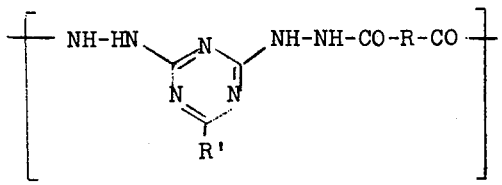

in which
R is a divalent aromatic radical of 6 to 15 carbon atoms, and
R' is alkyl of 1 to 4 carbon atoms, phenyl, alkoxy of 1 to 4 carbon atoms, phenoxy, dialkylamino of 2 to 8 carbon atoms, piperidyl, morpholyl or phosphonic acid dialkyl ester of 2 to 8 carbon atoms.

2. A polyacyl-dihydrazino-s-triazine as claimed in claim 1 wherein R is a divalent radical selected from the group consisting of

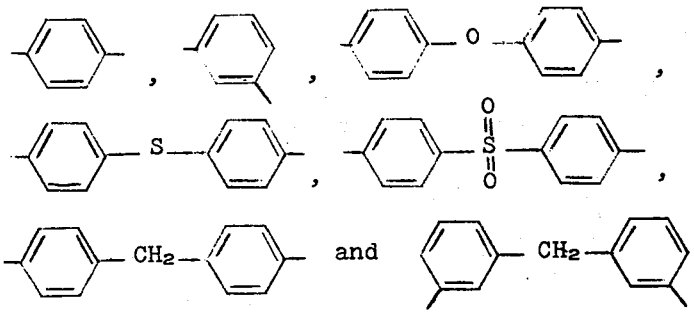

3. A polyacyl-dihydrazino-s-triazine as claimed in claim 2 wherein R' is a substituent selected from the group consisting of dimethylamino, methoxy, butoxy, phenyl, phosphonic acid diethyl ester, morpholino and phenoxy.

4. A polyacyl-dihydrazino-s-triazine as claimed in claim 1 wherein R is the divalent terephthaloyl radical

5. A polyacyl-dihydrazino-s-triazine as claimed in claim 1 wherein R is the divalent isophthaloyl radical

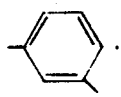

6. A polyacyl-dihydrazino-s-triazine as claimed in claim 1 wherein R is the divalent diphenyl ether radical

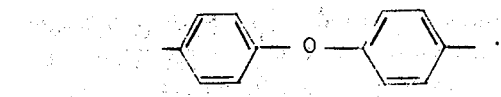

7. A process for the production of a polyacyl-dihydrazino-s-triazine with recurring structural units of the formula

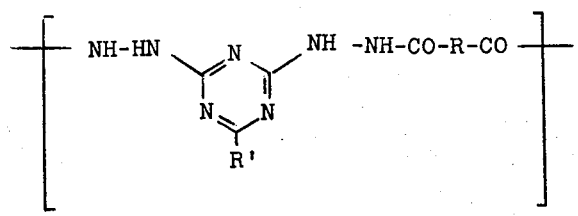

wherein R is a divalent aromatic radical and R' is alkyl of 1 to 4 carbon atoms, phenyl, alkoxy of 1 to 4 carbon atoms, phenoxy, dialkylamino of 2 to 8 carbon atoms, piperidyl, morpholyl or phosphoric acid dialkyl ester of 2 to 8 carbon atoms, which process comprises:

polycondensing at a temperature of about −10°C. to +60°C. and in the presence of an acid acceptor while stirring and drawing off the heat of reaction
a. at least one 2,4-dihydrazino-s-triazine of the formula

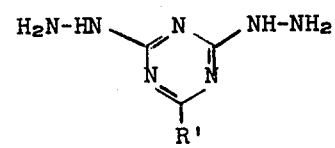

in which R' has the same meaning given above, with
(b) at least one aromatic dicarboxylic acid halide.

8. A process as claimed in claim 7 wherein the polycondensation of (a) with (b) is carried out in an inert organic solvent as a single phase solution condensation.

9. A process as claimed in claim 7 wherein the polycondensation of (a) with (b) is carried out in an immiscible mixture of two different inert solvents as a two phase interfacial polycondensation.

10. A process as claimed in claim 7 wherein the polycondensation is carried out in the presence of lithium chloride as a solubilizing agent.

11. A process as claimed in claim 8 wherein said inert organic solvent is selected from the group consisting of dimethylacetamide. N-methylpyrrolidone, hexamethylphosphoric acid triamide and mixtures thereof.

12. A process as claimed in claim 9 wherein the solvent mixture consists essentially of a mixture of water and an organic solvent selected from the group consisting of toluene, benzene, hexane, carbon tetrachloride, methylene chloride and mixtures thereof.

* * * * *